US011967265B2

(12) United States Patent
Lee et al.

(10) Patent No.: US 11,967,265 B2
(45) Date of Patent: Apr. 23, 2024

(54) DISPLAY DEVICE AND CONTROL METHOD THEREFOR

(71) Applicant: SAMSUNG ELECTRONICS CO., LTD., Suwon-si (KR)

(72) Inventors: Minhoon Lee, Suwon-si (KR); Byungkwan Kim, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 17/890,819

(22) Filed: Aug. 18, 2022

(65) Prior Publication Data

US 2022/0392390 A1 Dec. 8, 2022

Related U.S. Application Data

(63) Continuation of application No. PCT/KR2021/002071, filed on Feb. 18, 2021.

(30) Foreign Application Priority Data

Feb. 18, 2020 (KR) ........................ 10-2020-0019952

(51) Int. Cl.
*G09G 3/20* (2006.01)

(52) U.S. Cl.
CPC ... *G09G 3/2074* (2013.01); *G09G 2300/0443* (2013.01); *G09G 2300/0452* (2013.01);
(Continued)

(58) Field of Classification Search
CPC ......... G09G 3/2074; G09G 2300/0443; G09G 2300/0452; G09G 2320/0233;
(Continued)

(56) References Cited

U.S. PATENT DOCUMENTS 6,738,120 B1 5/2004 Song et al.
7,683,867 B2 3/2010 Inoue et al.
(Continued)

FOREIGN PATENT DOCUMENTS

JP 4511375 B2 7/2010
JP 2015-222328 A 12/2015
(Continued)

OTHER PUBLICATIONS

International Search Report (PCT/ISA/210) dated Jun. 15, 2021 by the International Searching Authority in International Application No. PCT/KR2021/002071.
(Continued)

*Primary Examiner* — Adam R. Giesy
(74) *Attorney, Agent, or Firm* — Sughrue Mion, PLLC

(57) ABSTRACT

A display device includes a communication interface including a circuit, a display panel including a plurality of pixels, the plurality of pixels comprising red (R), green (G), and blue (B) subpixels, a memory configured to store first luminance information and second luminance information, and a processor configured to acquire an output frame based on a plurality of subpixel values of pixels included in an input frame received via the communication interface, the first luminance information, and the second luminance information; and based on the acquired luminance values, control the display panel to output the output frame.

21 Claims, 10 Drawing Sheets

(52) U.S. Cl.
CPC ............... *G09G 2320/0233* (2013.01); *G09G 2320/0242* (2013.01); *G09G 2320/028* (2013.01); *G09G 2360/16* (2013.01)

(58) Field of Classification Search
CPC ..... G09G 2320/0242; G09G 2320/028; G09G 2360/16; G09G 3/3607; G09G 3/3614; G09G 2320/068; G09G 3/2003; G09G 2310/027; G09G 2360/147
See application file for complete search history.

(56) References Cited

U.S. PATENT DOCUMENTS

| | | | | |
|---|---|---|---|---|
| 8,502,762 | B2 | 8/2013 | Kamada et al. | |
| 10,297,228 | B2 | 5/2019 | Lee et al. | |
| 2006/0238472 | A1 | 10/2006 | Lee et al. | |
| 2014/0247289 | A1 | 9/2014 | Park et al. | |
| 2015/0187318 | A1 | 7/2015 | Kim | |
| 2018/0018938 | A1* | 1/2018 | Lee | G09G 5/06 |
| 2021/0280120 | A1* | 9/2021 | Zhang | G09G 3/3688 |

FOREIGN PATENT DOCUMENTS

| | | | |
|---|---|---|---|
| KR | 10-0288766 | B1 | 6/2001 |
| KR | 10-0354906 | B1 | 9/2002 |
| KR | 10-2006-0111262 | A | 10/2006 |
| KR | 10-0836986 | B1 | 6/2008 |
| KR | 10-1128467 | B1 | 3/2012 |
| KR | 10-1202037 | B1 | 11/2012 |
| KR | 10-1212168 | B1 | 12/2012 |
| KR | 10-2014-0108957 | A | 9/2014 |
| KR | 10-2018-0009153 | A | 1/2018 |

OTHER PUBLICATIONS

Written Opinion (PCT/ISA/237) dated Jun. 15, 2021 by the International Searching Authority in International Application No. PCT/KR2021/002071.

* cited by examiner

DISPLAY DEVICE AND CONTROL METHOD THEREFOR

CROSS REFERENCE TO RELATED APPLICATION(S)

This application is a by-pass continuation of International Application No. PCT/KR2021/002071, filed on Feb. 18, 2021, which based on and claims priority to Korean Patent Application No. 10-2020-0019952, filed on Feb. 18, 2020 in the Korean Intellectual Property Office, the disclosures of which are incorporated by reference herein in their entireties.

BACKGROUND

1. Field

The disclosure relates to a display device and a control method therefor, and more particularly, to a display device for improving a viewing angle, and a control method therefor.

2. Description of Related Art

One of the conditions for improving the image quality of a display device is providing a superior viewing angle.

However, due to an operation characteristic of a panel included in a display device, limitation of a viewing angle is generated. For example, although a viewing angle characteristic is good when outputting an image of a high gray scale, when outputting an image of a low gray scale, the viewing angle becomes bad, and a color loss phenomenon occurs.

In the past, for resolving such a problem, a method of additionally dividing subpixels, and dividing an area expressing a low gray scale and an area expressing a high gray scale was suggested. Also, a method of including a panel using a two-dimensional hole gas (2DHG) connection method was suggested. However, such methods have limitations that a separate circuit for additionally dividing subpixels is required, and a double number of driver integrated circuits (ICs) need to be included, and a size of a timing controller (TCON) should also become bigger. As can be seen above, conventional methods increase a manufacturing cost of a display device.

SUMMARY

Provided are a display device that can improve a viewing angle by mapping luminance values according to different luminance information to each of a plurality of red, green, blue (RGB) subpixels, and a control method therefor.

Additional aspects will be set forth in part in the description which follows and, in part, will be apparent from the description, or may be learned by practice of the presented embodiments.

According to an aspect of the disclosure, a display device may include a communication interface including a circuit, a display panel including a plurality of pixels, the plurality of pixels comprising red (R), green (G), and blue (B) subpixels, a memory configured to store first luminance information and second luminance information, and a processor configured to acquire an output frame based on a plurality of subpixel values of pixels included in an input frame received via the communication interface, the first luminance information, and the second luminance information; acquire, based on the first luminance information, a luminance value corresponding to at least one of the plurality of subpixel values; acquire, based on the second luminance information, a luminance value corresponding to the remaining of the plurality of subpixel values; and based on the acquired luminance values, control the display panel to output the output frame.

The display panel may include a structure such that the plurality of pixels are arranged in a matrix, and the processor may be further configured to apply a voltage of a first polarity to first subpixels of the same color included in a first row in the matrix, and apply a voltage of a second polarity to second subpixels of the same color included in a second row adjacent to the first row.

The processor may be further configured to group the plurality of pixels into a plurality of groups, for third subpixels among the plurality of subpixels of the same color included in one group among the plurality of groups, acquire a luminance value based on the first luminance information, for fourth subpixels among the plurality of subpixels, and acquire a luminance value based on the second luminance information. The number of the third subpixels and a number of the fourth subpixels may be the same.

The processor may be further configured to group the plurality of pixels into a plurality of groups each including four pixels such that each group of the plurality of groups comprises four R subpixels, four G subpixels, and four B subpixels, apply a voltage of the first polarity to two R subpixels included in one group among the plurality of groups, and apply a voltage of the second polarity to the remaining two R subpixels, apply a voltage of the first polarity to two G subpixels included in one group among the plurality of groups, and apply a voltage of the second polarity to the remaining two G subpixels, and apply a voltage of the first polarity to two B subpixels included in one group among the plurality of groups, and apply a voltage of the second polarity to the remaining two B subpixels.

The processor may be further configured to, based on the first luminance information, acquire a luminance value corresponding to one of the two R subpixels to which the voltage of the first polarity is applied, and based on the second luminance information, acquire a luminance value corresponding to the remaining one of the two R subpixels to which the voltage of the first polarity is applied, based on the first luminance information, acquire a luminance value corresponding to one of the two G subpixels to which the voltage of the first polarity is applied, and based on the second luminance information, acquire a luminance value corresponding to the remaining one of the two G subpixels to which the voltage of the first polarity is applied, and based on the first luminance information, acquire a luminance value corresponding to one of the two B subpixels to which the voltage of the first polarity is applied, and based on the second luminance information, acquire a luminance value corresponding to the remaining one of the two B subpixels to which the voltage of the first polarity is applied.

The processor may be further configured to, based on the first luminance information, acquire a luminance value corresponding to one of the two R subpixels to which the voltage of the second polarity is applied, and based on the second luminance information, acquire a luminance value corresponding to the remaining one of the two R subpixels to which the voltage of the second polarity is applied, based on the first luminance information, acquire a luminance value corresponding to one of the two G subpixels to which the voltage of the second polarity is applied, and based on the second luminance information, acquire a luminance value corresponding to the remaining one of the two G subpixels to which the voltage of the second polarity is applied, and based on the first luminance information, acquire a luminance value corresponding to one of the two B subpixels to which the voltage of the second polarity is applied, and based on the second luminance information, acquire a luminance value corresponding to the remaining one of the two B subpixels to which the voltage of the second polarity is applied.

The two G subpixels for which luminance values were acquired based on the first luminance information may be respectively included in adjacent pixels, and the two G subpixels for which luminance values were acquired based on the second luminance information may be respectively included in adjacent pixels.

The number of the third subpixels having luminance values acquired based on the first luminance information and the number of the fourth subpixels having luminance values acquired based on the second luminance information may be the same.

The first luminance information may include a luminance value corresponding to a high gray scale greater than or equal to a threshold gray scale, and the second luminance information may include a luminance value corresponding to a low gray scale less than the threshold gray scale.

A plurality of subpixels of the plurality of pixels may be connected with one gate line and one data line.

According to an aspect of the disclosure, a control method for a display device including a display panel that includes a plurality of pixels, the plurality of pixels including R, G and B subpixels, may include acquiring, based on first luminance information, a luminance value corresponding to at least one of the plurality of subpixel values of pixels included in an input frame, acquiring, based on second luminance information, a luminance value corresponding to the remaining of the plurality of subpixel values, and, based on the acquired luminance values, acquiring an output frame, and controlling the display panel to output the acquired output frame.

The display panel may include a structure such that the plurality of pixels are arranged in a matrix. The method may further include applying a voltage of a first polarity to first subpixels of the same color included in a first row in the matrix and applying a voltage of a second polarity to second subpixels of the same color included in a second row adjacent to the first row.

The method may further include grouping the plurality of pixels into a plurality of groups. The acquiring the luminance value based on the first luminance information may include, for third subpixels among the plurality of subpixels of the same color included in one group among the plurality of groups, acquiring a luminance value based on the first luminance information. The acquiring the luminance value based on the second luminance information may include, for fourth subpixels among the plurality of subpixels, acquiring a luminance value based on the second luminance information. A number of the third subpixels and a number of the fourth subpixels may be the same.

The method may further include alternatingly mapping the luminance value acquired based on the first luminance information and the luminance value acquired based on the second luminance information to the first subpixels of the same color included in the first row in the matrix.

According to the various embodiments of the disclosure as described above, a viewing angle of an output image may be improved without a change of a panel structure of a display device.

Also, according to the various embodiments of the disclosure, a viewing angle of an image provided on a side surface may be improved without a distortion of an image provided on a front surface of a display device.

BRIEF DESCRIPTION OF THE DRAWINGS

The above and other aspects, features, and advantages of certain embodiments of the present disclosure will be more apparent from the following description taken in conjunction with the accompanying drawings, in which.

DETAILED DESCRIPTION

Figure 1:
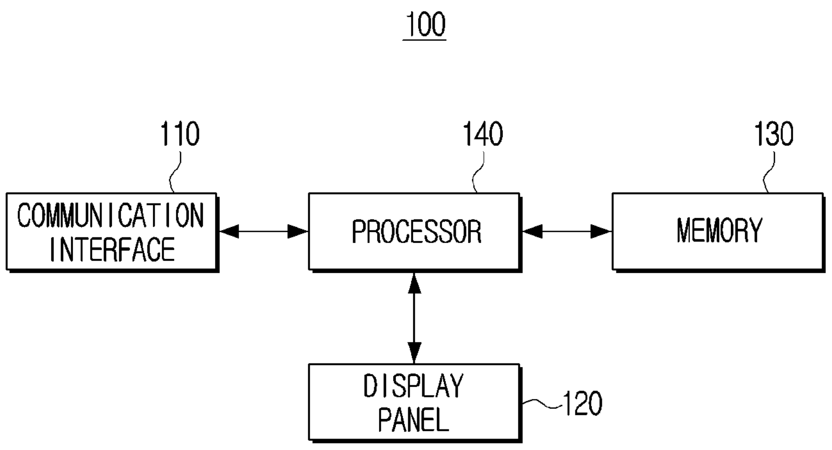
FIG. 1 is a schematic block diagram of a configuration of a display device according to an embodiment of the disclosure.

Hereinafter, the disclosure will be described in detail with reference to the accompanying drawings.

As terms used in the embodiments of the disclosure, general terms that are currently used widely were selected as far as possible, in consideration of the functions described in the disclosure. However, the terms may vary depending on the intention of those skilled in the art who work in the pertinent field, previous court decisions, or emergence of new technologies, etc. Also, in particular cases, there may be terms that were designated by the applicant on his own, and in such cases, the meaning of the terms will be described in detail in the relevant descriptions in the disclosure. Accordingly, the terms used in the disclosure should be defined based on the meaning of the terms and the overall content of the disclosure, but not just based on the names of the terms.

Also, in this specification, expressions such as “have,” “may have,” “include,” and “may include” denote the existence of such characteristics (e.g.: elements such as numbers, functions, operations, and components), and do not exclude the existence of additional characteristics.

In addition, the expression “at least one of A and/or B” should be interpreted to mean any one of “A” or “B” or “A and B.”

Further, the expressions “first,” “second” and the like used in this specification may be used to describe various elements regardless of any order and/or degree of importance.

Also, such expressions are used only to distinguish one element from another element, and are not intended to limit the elements.

Also, the description in the disclosure that one element (e.g.: a first element) is "(operatively or communicatively) coupled with/to" or "connected to" another element (e.g.: a second element) should be interpreted to include both the case where the one element is directly coupled to the another element, and the case where the one element is coupled to the another element through still another element (e.g.: a third element).

In addition, singular expressions include plural expressions, unless defined differently in the context. Further, in the disclosure, terms such as "include" should be construed as designating that there are such characteristics, numbers, steps, operations, elements, components, or a combination thereof described in the specification, but not as excluding in advance the existence or possibility of adding one or more of other characteristics, numbers, steps, operations, elements, components, or a combination thereof.

Also, in the disclosure, "a module" or "a part" performs at least one function or operation, and may be implemented as hardware or software, or as a combination of hardware and software. Further, a plurality of "modules" or "parts" may be integrated into at least one module and implemented as at least one processor, except "modules" or "parts" which need to be implemented as specific hardware.

In addition, in this specification, the term "user" may refer to a person who uses an electronic device or a device using an electronic device (e.g.: an artificial intelligence electronic device).

Hereinafter, embodiments of the disclosure will be described in more detail with reference to the accompanying drawings.

FIG. 1 is a schematic block diagram of a configuration of a display device according to an embodiment of the disclosure.

Referring to FIG. 1, a display device 100 according to an embodiment of the disclosure may include a communication interface 110, a display panel 120, a memory 130, and a processor 140.

The display device 100 displays video data. The display device 100 may be implemented as a TV, but is not limited thereto, and any device equipped with a display function such as a video wall, a large format display (LFD), digital signage, a digital information display (DID), a projector display, etc. can be applied without limitation. Also, the display device 100 may be implemented as displays in various forms such as a liquid crystal display (LCD), an organic light-emitting diode (OLED), liquid crystal on silicon (LCoS), digital light processing (DLP), a quantum dot (QD) display panel, quantum dot light-emitting diodes (QLED), micro light-emitting diodes (μLED), mini LED, etc. The display device 100 may also be implemented as a touch screen combined with a touch sensor, a flexible display, a rollable display, a 3D display, a display to which a plurality of display modules are physically connected, etc.

The communication interface 110 including a circuit according to an embodiment of the disclosure receives inputs of various types of images. For example, the communication interface 110 may receive an input of an image signal by a streaming or downloading method from an external device (e.g., a source device), an external storage medium (e.g., a Universal Serial Bus (USB) memory), an external server (e.g., a webhard), etc. through communication methods such as Wi-Fi based on an access point (a wireless local area network (LAN) network), Bluetooth, Zigbee, a wired/wireless LAN, a Wide Area Network (WAN), Ethernet, IEEE 1394, a High-Definition Multimedia Interface (HDMI), a USB, a Mobile High-Definition Link (MHL), Audio Engineering Society/European Broadcasting Union (AES/EBU), Optical, Coaxial, $5^{th}$ generation (5G), long term evolution (LTE), etc. The image signal may be a digital image signal of any one of Standard Definition (SD), High Definition (HD), Full HD, or Ultra HD images, but is not limited thereto.

In particular, the communication interface 110 according to an embodiment of the disclosure may receive an input of an image from an external device. For example, the display device 100 may sequentially receive a plurality of image frames constituting an image through the communication interface 110.

This is merely an example, and the disclosure is not limited thereto. For example, the display device 100 may store an image received through the communication interface 110 in the memory 130, and load the image from the memory 130, and provide it through the display panel 120. As another example, the display device 100 can load an image previously stored in the memory 130, and provide it through the display panel 120.

The display panel 120 according to an embodiment of the disclosure may include a plurality of pixels, and display an image signal. For example, the plurality of respective pixels may include subpixels expressing red (R), green (G), and blue (B). As another example, a pixel may include subpixels expressing W in addition to RGB.

The display panel 120 may include a plurality of gate lines and a plurality of data lines. A gate line is a line transmitting a scan signal or a gate signal, and a data line is a line transmitting a data voltage. For example, each of the plurality of subpixels included in the display panel 120 may be connected with one gate line and one data line. Such a connection method is referred to as a one dimensional one gate (1D1G) structure.

The memory 130 may store luminance information. The memory 130 may store a plurality of luminance information corresponding to each of a plurality of values. As an example, in the memory 130, first luminance information corresponding to a first value and second luminance information corresponding to a second value may be stored. The luminance information may be implemented as a look up table generated with a plurality of gamma values, but the disclosure is not limited thereto.

The processor 140 controls the overall operations of the display device 100.

According to an embodiment, the processor 140 may be implemented as a digital signal processor (DSP) processing digital image signals, a microprocessor, an artificial intelligence (AI) processor, and a timing controller (TCON). However, the disclosure is not limited thereto, and the processor 140 may include one or more of a central processing unit (CPU), a micro controller unit (MCU), a micro processing unit (MPU), a controller, an application processor (AP), or a communication processor (CP), and an ARM processor, or may be defined by the terms. Also, the processor 140 may be implemented as a system on chip (SoC) having a processing algorithm stored therein or large scale integration (LSI), or in the form of a field programmable gate array (FPGA).

The processor 140 according to an embodiment may acquire an output frame based on two or more luminance information among the plurality of luminance information according to a level of improvement of a viewing angle or a level of compensation.

The processor 140 according to an embodiment may acquire an output frame based on a plurality of subpixel values constituting pixel values included in an input frame, the first luminance information, and the second luminance information. As an example, the processor 140 may acquire a luminance value corresponding to at least one of the plurality of subpixel values based on the first luminance information. Also, the processor 140 may acquire a luminance value corresponding to the rest of the plurality of subpixel values based on the second luminance information. Then, the processor 140 may control the display panel 120 to output an output frame based on the acquired luminance values. Detailed explanation in this regard will be made with reference to FIG. 3.

Figure 3:
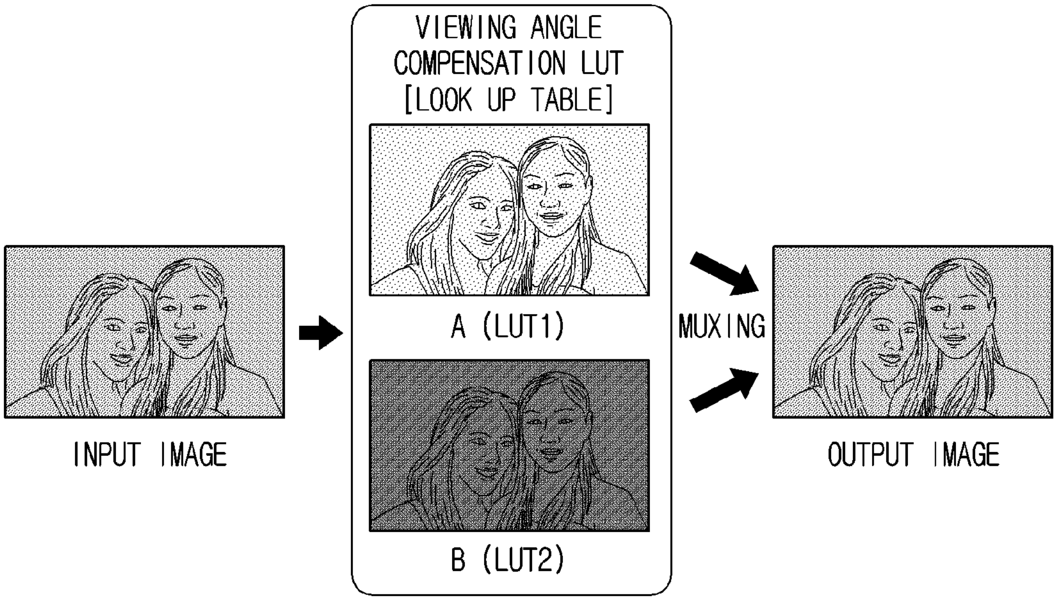
FIG. 3 is a diagram of an output frame according to an embodiment of the disclosure.

FIG. 3 is a diagram of an output frame according to an embodiment of the disclosure.

Referring to FIG. 3, the processor 140 according to an embodiment may acquire a luminance value corresponding to the plurality of subpixel values constituting the pixel value included in the input frame based on the first luminance information. As an example, the processor 140 may acquire a luminance value corresponding to at least one of the plurality of subpixel values based on the first luminance information. The first luminance information is luminance information corresponding to a first gamma value greater than or equal to a predetermined gamma value (e.g., a reference gamma value), and the first luminance information may include a luminance value corresponding to a high gray scale greater than or equal to a threshold gray scale corresponding to the reference gamma value.

Also, the processor 140 according to an embodiment may acquire a luminance value corresponding to the plurality of subpixel values constituting the pixel value included in the input frame based on the second luminance information. As an example, the processor 140 may acquire a luminance value corresponding to the rest of the plurality of subpixel values based on the second luminance information. The second luminance information is luminance information corresponding to a second gamma value smaller than the predetermined gamma value (e.g., the reference gamma value), and the second luminance information may include a luminance value corresponding to a low gray scale smaller than the threshold gray scale corresponding to the reference gamma value.

Each of the plurality of luminance information according to an embodiment may include an output luminance value corresponding to an input gray scale value. The corresponding relation between the gray scale value and the luminance value may be determined as a function of a gamma value. For example, the reference gamma value may be 2.2 which is a standard gamma value of the National Television System Committee (NTSC). As another example, the reference gamma value may be 2.8 which is a standard gamma value of the Phase Alternation by Line (PAL). The first luminance information may include an output luminance value corresponding to a high gray scale greater than or equal to the threshold gray scale (e.g., the reference gamma value), and the second luminance information may include an output luminance value corresponding to a low gray scale smaller than the threshold gray scale. Hereinafter, for the convenience of explanation, the first luminance information corresponding to the first gamma value will be illustrated as 'A (LUT1),' and the second luminance information corresponding to the second gamma value will be illustrated as 'B (LUT2).' Also, in FIG. 3, the luminance information is illustrated as 'a viewing angle compensation look up table (LUT),' for the convenience of explanation, but this is merely a term for the convenience of explanation, and the implementation form of the luminance information is not limited to a LUT.

If the first luminance information having a high gamma value is used, it is easy to distinguish the brightness of a high gray scale area, and if the second luminance information having a low gamma value is used, it is easy to distinguish the brightness of a low gray scale area. Thus, the processor 140 may acquire a luminance value corresponding to each of the plurality of subpixel values constituting the pixel value included in the input frame based on the first luminance information and the second luminance information.

The processor 140 according to an embodiment may alternatingly map a luminance value acquired based on the first luminance information and a luminance value acquired based on the second luminance information.

According to an embodiment, the processor 140 may change the plurality of subpixel values constituting the input frame to values by which the viewing angle characteristic is improved based on at least two luminance information (e.g., 'A (LUT1)' and 'B (LUT2)'), and alternatingly mux a first frame including a value changed based on the first luminance information and a second frame including a value changed based on the second luminance information, and thereby acquire an output frame.

The display panel 120 according to an embodiment may have a structure where a plurality of pixels are arranged in a matrix form. The processor 140 may identify luminance information applied to each of the plurality of RGB subpixels based on the locations of each of the RGB subpixels included in each of the plurality of pixels on the display panel 120. For example, the processor 140 may alternatingly map a luminance value acquired based on the first luminance information and a luminance value acquired based on the second luminance information to each of the RGB subpixels. In this case, the gamma value of the output frame may have the same characteristic as the reference gamma value on the front surface of the display device 100. Also, the output frame may have a visually advantageous characteristic on the side surface of the display device 100. That is, the output frame of which expression for a low gray scale has been improved may have an effect that the viewing angle has been improved on the side surface of the display device 100. Hereinafter, various embodiments of alternatingly mapping a luminance value acquired based on the first luminance information and a luminance value acquired based on the second luminance information to the plurality of subpixels so that an output frame can have an effect that the viewing angle has been improved will be described.

Figure 4:
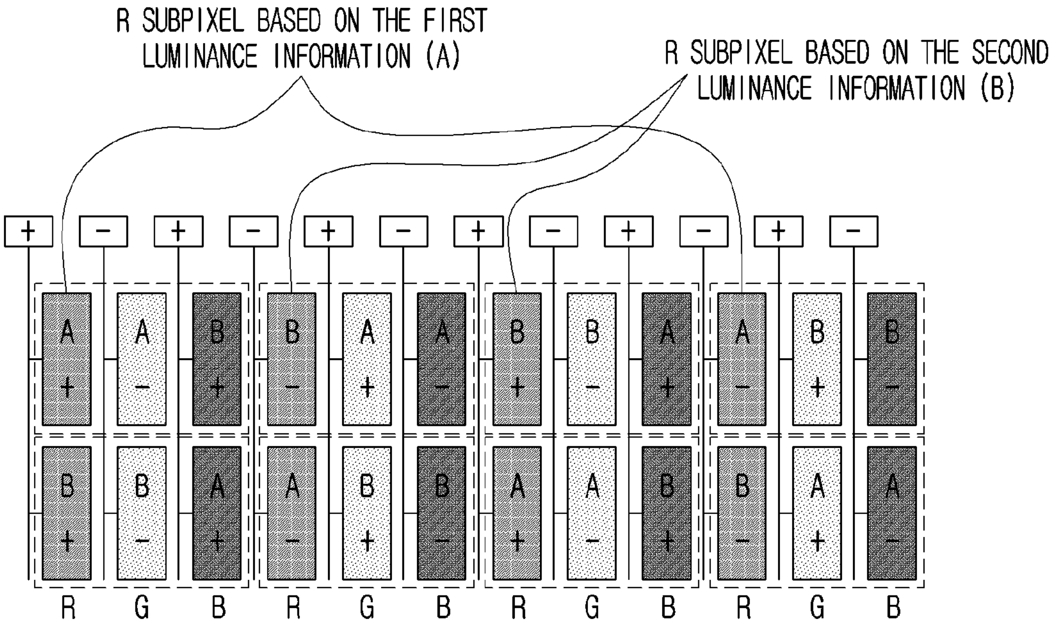
FIG. 4 is a diagram of mapping a luminance value to each of a plurality of subpixels according to an embodiment of the disclosure.

FIG. 4 is a diagram of mapping a luminance value to each of a plurality of subpixels according to an embodiment of the disclosure.

Referring to FIG. 4, the display panel 120 may have a structure where a plurality of pixels are arranged in a matrix form. Also, each of the plurality of pixels may include RGB subpixels. Each of the plurality of subpixels may be connected with one gate line and one data line. For example, to subpixels of the same color included in the same first row in the matrix form, a voltage of first polarity may be applied. Also, to subpixels of the same color included in the second row adjacent to the first row, a voltage of second polarity may be applied.

Referring to FIG. 4, to a red (R) subpixel, a (+) gate line may be connected, and to a green (G) subpixel adjacent to the red (R) subpixel, a (−) gate line may be connected. Then, to a blue (B) subpixel adjacent to the green (G) subpixel, a (+) gate line may be connected. As (+) gate lines and (−) gate lines are alternatingly connected to each of the plurality of subpixels, the display panel 120 according to an embodiment may be implemented as a 1D1G structure.

The processor 140 according to an embodiment of the disclosure may group a plurality of pixels into a plurality of pixel groups. Then, the processor 140 may, for first subpixels among the plurality of subpixels of the same color included in one group among the plurality of groups, acquire a luminance value based on the first luminance information, and for second subpixels among the plurality of subpixels, the processor 140 may acquire a luminance value based on the second luminance information.

Referring to FIG. 4, the processor 140 according to an embodiment may group the plurality of pixels into units of four pixels. For example, one group may include 12 subpixels in total (four R subpixels, four G subpixels, and four B subpixels). For some subpixels among the four R subpixels included in one group, the processor 140 according to an embodiment may map the luminance value acquired based on the first luminance information. Also, for the rest subpixels among the four R subpixels, the processor 140 may map the luminance value acquired based on the second luminance information.

Referring to FIG. 4, the processor 140 may group a plurality of pixels located on the same line into units of four pixels, and map the luminance value acquired based on the first luminance information ('A') to two R subpixels among the four R subpixels. Also, the processor 140 may map the luminance value acquired based on the second luminance information ('B') to the rest two R subpixels among the four R subpixels.

Referring to FIG. 4 for the convenience of explanation, R, G, and B subpixels may constitute one pixel, and the processor 140 may group the pixel into units of four pixels. Then, two R subpixels among the R subpixels included in each of the four pixels may have a luminance value acquired based on the first luminance information ('A'), and the rest two R subpixels may have a luminance value acquired based on the second luminance information ('B').

Also, the processor 140 may map the luminance value acquired based on the first luminance information ('A') to two G subpixels among the four G subpixels. Also, the processor 140 may map the luminance value acquired based on the second luminance information ('B') to the rest two G subpixels among the four G subpixels.

In addition, the processor 140 may map the luminance value acquired based on the first luminance information ('A') to two B subpixels among the four B subpixels. Also, the processor 140 may map the luminance value acquired based on the second luminance information ('B') to the rest two B subpixels among the four B subpixels.

Accordingly, for the first subpixels among the plurality of subpixels of the same color included in one group among the plurality of groups, the processor 140 may acquire a luminance value based on the first luminance information, and for the second subpixels among the plurality of subpixels, the processor 140 may acquire a luminance value based on the second luminance information. The number of the first subpixels and the number of the second subpixels, or the ratios of them may be the same.

In an embodiment of the disclosure, explanation was made based on the assumption of a case where the processor 140 groups a plurality of pixels located on the same line into units of four pixels, for the convenience of explanation, but this is merely an example, and the disclosure is not limited thereto. For example, the processor 140 may perform grouping for a plurality of pixels into units of two or six pixels, and to some of a plurality of subpixels of the same color included in a group, the processor 140 may map a luminance value acquired based on the first luminance information, and to the rest subpixels, the processor 140 may map a luminance value acquired based on the second luminance information.

Referring to FIG. 4, among 12 subpixels included in one group, four R subpixels may be implemented as an R subpixel to which a luminance value according to the first luminance information of the (+) polarity is mapped, an R subpixel to which a luminance value according to the first luminance information of the (−) polarity is mapped, an R subpixel to which a luminance value according to the second luminance information of the (+) polarity is mapped, and an R subpixel to which a luminance value according to the second luminance information of the (−) polarity is mapped.

Also, among 12 subpixels included in one group, four G subpixels may be implemented as a G subpixel to which a luminance value according to the first luminance information of the (+) polarity is mapped, a G subpixel to which a luminance value according to the first luminance information of the (−) polarity is mapped, a G subpixel to which a luminance value according to the second luminance information of the (+) polarity is mapped, and a G subpixel to which a luminance value according to the second luminance information of the (−) polarity is mapped.

In addition, among 12 subpixels included in one group, four B subpixels may be implemented as a B subpixel to which a luminance value according to the first luminance information of the (+) polarity is mapped, a B subpixel to which a luminance value according to the first luminance information of the (−) polarity is mapped, a B subpixel to which a luminance value according to the second luminance information of the (+) polarity is mapped, and a B subpixel to which a luminance value according to the second luminance information of the (−) polarity is mapped.

According to an embodiment, a first luminance value according to the first luminance information and a second luminance value according to the second luminance information may be alternatingly mapped to each of a plurality of subpixels on the same line. For example, luminance values may be mapped to a plurality of subpixels like 'ABABABABABAB.' However, this is merely an example, and the disclosure is not limited thereto. For example, referring to FIG. 4, luminance values can be mapped to a plurality of subpixels like 'AABBAABBAABB.'

Referring to FIG. 4, the processor 140 may alternatingly map a luminance value acquired based on the first luminance information and a luminance value acquired based on the second luminance information to subpixels of the same color included in the same first row in the matrix form.

As an example, if a luminance value according to the first luminance information is mapped to a subpixel of a pixel line adjacent to a specific subpixel, the processor 140 may map a luminance value according to the second luminance information to the specific subpixel. Referring to FIG. 4, to an R subpixel located on the first pixel line, the processor 140 may map a luminance value according to the first luminance information, and to an R subpixel located on the second pixel line adjacent to the first pixel line, the processor 140 may map a luminance value according to the second luminance information. Accordingly, if luminance values are mapped to the plurality of subpixels included in the first pixel line like 'AABBAABBAABB,' the processor 140 may map luminance values to the plurality of subpixels included in the second pixel line adjacent to the first pixel line like 'BBAABBAABBAA.' That is, the arrangement forms of the luminance values applied to the plurality of subpixels included in the first pixel line and the luminance values applied to the plurality of subpixels included in the second pixel line may be inverted forms.

According to an embodiment, the processor 140 may map a luminance value acquired based on the first luminance information corresponding to a high gray scale to half of the plurality of subpixels included in the display panel 120, and map a luminance value acquired based on the second luminance information corresponding to a low gray scale to the rest half. The processor 140 may control the display panel 120 such that an output frame provided to a user located on the front surface of the display device 100 has the same characteristic as the reference gamma value.

Also, as the processor 140 maps a luminance value acquired based on the second luminance information corresponding to a low gray scale to some of the plurality of subpixels, the processor 140 may control the display panel 120 to display an output frame of which expression for a low gray scale has been improved. As expressions for each of a low gray scale and a high gray scale are improved, an effect that a viewing angle of an output frame provided to a user located on the side surface of the display device 100 has been improved may be exerted. That is, the processor 140 may alternate two or more luminance information (e.g., values of the look up tables) for each of the plurality of lookup tables according to a level of improvement of a viewing angle or a level of compensation, and acquire an output frame. For example, the processor 140 may acquire a new output frame where a high gray scale is expressed by using a value taken from the first luminance information generated as a first gamma value, and a low gray scale is expressed by using a value taken from the second luminance information generated as a second gamma value. If luminance information having a low gamma value is used, it is easy to distinguish the brightness of a low gray scale area, and in a look up table having a high gamma value, it is easy to distinguish the brightness of a high gray scale area. An output frame including both of low gray scale and high gray scale characteristics provides luminance using a reference gamma value according to an average value of a low gray scale and a high gray scale to a user located on the front surface, and at the same time, to a user located on the side surface, an output frame of which expression for a high gray scale having a higher gamma value than the reference gamma value has been improved is provided, and thus an effect that a viewing angle has been improved can be provided.

A display device 100 can be provided where, if expressions for a low gray scale and a high gray scale are improved, a viewing angle can be improved on the side surface based on the display device 100.

As the output frame has the aforementioned characteristic, the number of the first subpixels having a luminance value acquired based on the first luminance information and the number of the second subpixels having a luminance value acquired based on the second luminance information among the plurality of subpixels constituting the pixels included in the output frame may be the same.

Figure 5:
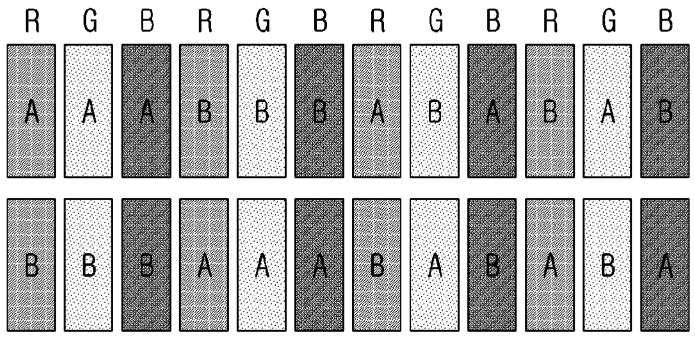
FIG. 5 is a diagram of mapping a luminance value to each of a plurality of subpixels according to another embodiment of the disclosure.

FIG. 5 is a diagram of mapping a luminance value to each of a plurality of subpixels according to another embodiment of the disclosure.

The processor 140 according to an embodiment of the disclosure may map a luminance value according to the first luminance information to half of a plurality of pixels of the same color included in one group, and map a luminance value according to the second luminance information to the rest half. In particular, the processor 140 may map a luminance value according to the first luminance information or a luminance value according to the second luminance information to each of the plurality of subpixels based on various methods.

In FIG. 5, illustration of gate lines connected to each of the plurality of subpixels was omitted, for the convenience of explanation, but it may be that a (+) gate line and a (−) gate line are alternatingly connected to each of the plurality of subpixels.

The processor 140 according to an embodiment may group a plurality of pixels into a plurality of groups respectively including four pixels, and apply a voltage of the first polarity to two R subpixels included in one group among the plurality of groups, and apply a voltage of the second polarity to the rest two R sub pixels, and apply a voltage of the first polarity to two G subpixels included in one group among the plurality of groups, and apply a voltage of the second polarity to the rest two G sub pixels, and apply a voltage of the first polarity to two B subpixels included in one group among the plurality of groups, and apply a voltage of the second polarity to the rest two B sub pixels. The first polarity may mean a (+) electrode, and the second polarity may mean a (−) electrode. Also, for the convenience of explanation, it was assumed that the processor 140 applies the first or second polarity to each of the plurality of subpixels, but the disclosure is not limited thereto. For example, in the manufacturing process of the display panel 120, the display panel 120 may be implemented in a form where (+) gate lines are connected to some subpixels among the plurality of subpixels, and (−) gate lines are connected to the rest subpixels.

In the display device 100, problems such as crosstalk of an image, flicker, load balance, and increase of power consumption may be generated, and thus the polarity of each subpixel may be set differently. For example, in prevention of a crosstalk phenomenon, a point inversion where all adjacent subpixels have different polarities is advantageous. The processor 140 may identify luminance information to be applied to each subpixel among the plurality of luminance information in response to inversion/non-inversion signals controlling the polarities of the subpixels.

Also, in an embodiment of the disclosure, explanation was made based on the assumption that 12 subpixels are grouped into one group, but the disclosure is not limited thereto. Further, in case one group includes 12 subpixels, the one group may be referred to as a 12 cycle unit, for the convenience of explanation.

The processor 140 according to an embodiment may, based on the first luminance information, acquire a luminance value corresponding to one of two R subpixels to which a voltage of the first polarity is applied, and based on the second luminance information, acquire a luminance value corresponding to the rest one of the two R subpixels to which the voltage of the first polarity is applied, and based on the first luminance information, acquire a luminance value corresponding to one of two R subpixels to which a voltage of the second polarity is applied, and based on the second luminance information, acquire a luminance value corresponding to the rest one of the two R subpixels to which the voltage of the second polarity is applied.

Also, the processor 140 may, based on the first luminance information, acquire a luminance value corresponding to one of two G subpixels to which a voltage of the first polarity is applied, and based on the second luminance information, acquire a luminance value corresponding to the rest one of the two G subpixels to which the voltage of the first polarity is applied, and based on the first luminance information, acquire a luminance value corresponding to one of two G subpixels to which a voltage of the second polarity is applied, and based on the second luminance information, acquire a luminance value corresponding to the rest one of the two G subpixels to which the voltage of the second polarity is applied.

In addition, the processor 140 may, based on the first luminance information, acquire a luminance value corresponding to one of two B subpixels to which a voltage of the first polarity is applied, and based on the second luminance information, acquire a luminance value corresponding to the rest one of the two B subpixels to which the voltage of the first polarity is applied, and based on the first luminance information, acquire a luminance value corresponding to one of two B subpixels to which a voltage of the second polarity is applied, and based on the second luminance information, acquire a luminance value corresponding to the rest one of the two B subpixels to which the voltage of the second polarity is applied.

As illustrated in FIG. 5, the processor 140 according to an embodiment may map a luminance value to each of the plurality of subpixels in an arrangement of 'AAABBBA-BABAB' in the first pixel line. Referring to FIG. 5, the processor 140 may map a luminance value acquired based on the first luminance information ('A') to two R subpixels among four R subpixels in one group. Also, the processor 140 may map a luminance value acquired based on the second luminance information ('B') to the rest two R subpixels among the four R subpixels.

Further, the processor 140 may map a luminance value acquired based on the first luminance information ('A') to two G subpixels among four G subpixels. Also, the processor 140 may map a luminance value acquired based on the second luminance information ('B') to the rest two G subpixels among the four G subpixels.

In addition, the processor 140 may map a luminance value acquired based on the first luminance information ('A') to two B subpixels among four B subpixels. Also, the processor 140 may map a luminance value acquired based on the second luminance information ('B') to the rest two B subpixels among the four B subpixels.

To the plurality of subpixels included in the second pixel line adjacent to the first pixel line, the processor 140 may map luminance values in an arrangement of 'BBBAAABA-BABA.' Mapping luminance values may mean acquiring and mapping luminance values based on luminance information corresponding to an arrangement among a plurality of luminance information.

For example, in an arrangement of 'BBBAAABA-BABA,' the processor 140 may acquire and map a luminance value based on the second luminance information corresponding to B to the first subpixel in one group, acquire and map a luminance value based on the second luminance information corresponding to B to the second subpixel, . . . , and acquire and map a luminance value based on the second luminance information corresponding to A to the last subpixel.

Figure 6:
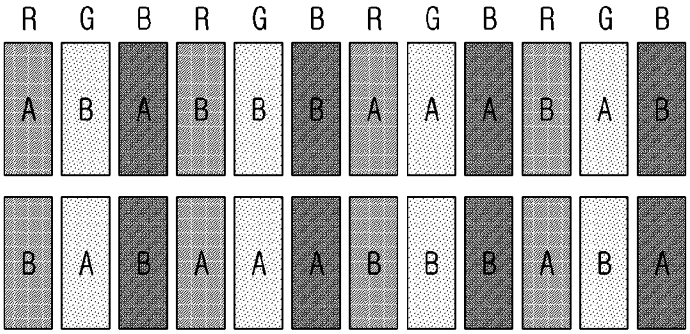
FIG. 6 is a diagram of mapping a luminance value to each of a plurality of subpixels according to another embodiment of the disclosure.

FIG. 6 is a diagram of mapping a luminance value to each of a plurality of subpixels according to another embodiment of the disclosure.

Referring to FIG. 6, among 12 subpixels included in one group, four R subpixels may be implemented as an R subpixel to which a luminance value according to the first luminance information of the (+) polarity is mapped, an R subpixel to which a luminance value according to the first luminance information of the (−) polarity is mapped, an R subpixel to which a luminance value according to the second luminance information of the (+) polarity is mapped, and an R subpixel to which a luminance value according to the second luminance information of the (−) polarity is mapped. Also, among 12 subpixels included in one group, four G subpixels may be implemented as a G subpixel to which a luminance value according to the first luminance information of the (+) polarity is mapped, a G subpixel to which a luminance value according to the first luminance information of the (−) polarity is mapped, a G subpixel to which a luminance value according to the second luminance information of the (+) polarity is mapped, and a G subpixel to which a luminance value according to the second luminance information of the (−) polarity is mapped. In addition, among 12 subpixels included in one group, four B subpixels may be implemented as a B subpixel to which a luminance value according to the first luminance information of the (+) polarity is mapped, a B subpixel to which a luminance value according to the first luminance information of the (−) polarity is mapped, a B subpixel to which a luminance value according to the second luminance information of the (+) polarity is mapped, and a B subpixel to which a luminance value according to the second luminance information of the (−) polarity is mapped.

That is, the processor 140 may map luminance values in an arrangement of 'ABABBBAAABAB' to the first pixel line, and map luminance values in an arrangement of 'BABAAABBBABA' to the second pixel line. Through this, the processor 140 may achieve an effect that an output frame maintains the original luminance on the front surface of the display device 100, and at the same time, improves the viewing angle on the side surface of the display device 100.

Figure 7:
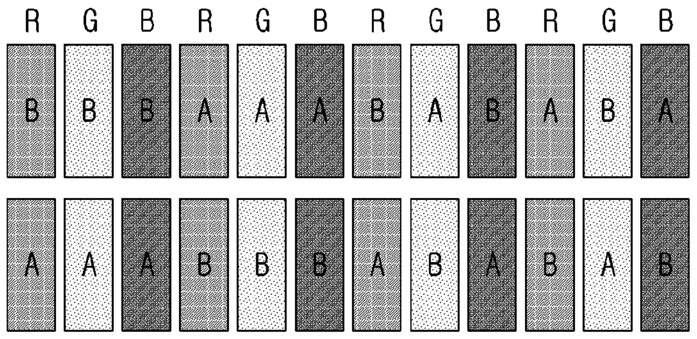
FIG. 7 is a diagram of mapping a luminance value to each of a plurality of subpixels according to another embodiment of the disclosure.

FIG. 7 is a diagram of mapping a luminance value to each of a plurality of subpixels according to another embodiment of the disclosure.

FIG. 7 is another example different from the arrangements illustrated in FIG. 4 to FIG. 6, and the processor 140 may map luminance values in an arrangement of 'BBBAAABA-BABA' to the first pixel line, and map luminance values in an arrangement of 'AAABBBABABAB' to the second pixel line.

Figure 8:
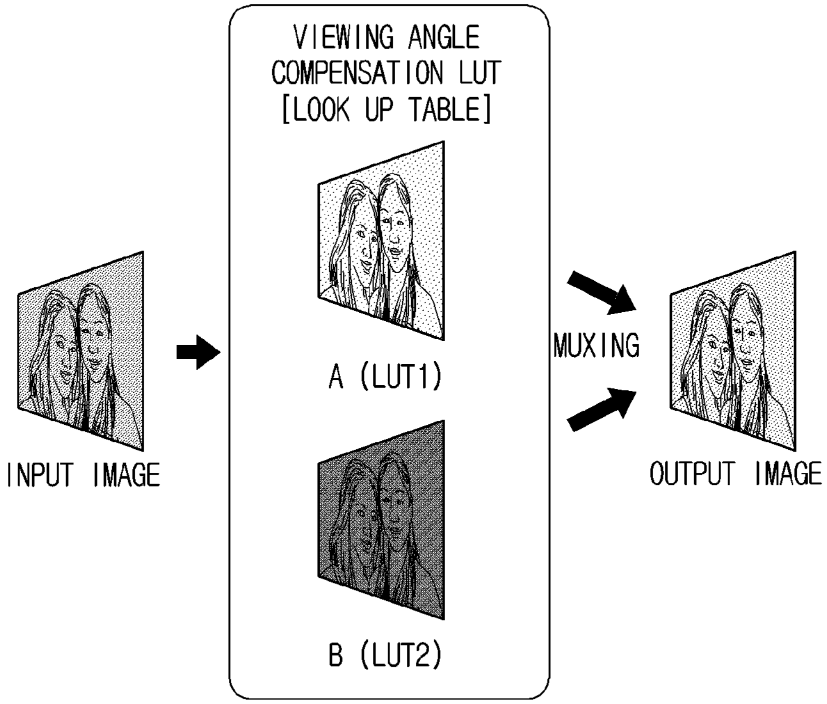
FIG. 8 is a diagram of improvement of a viewing angle according to an embodiment of the disclosure.

FIG. 8 is a diagram of improvement of a viewing angle according to an embodiment of the disclosure.

According to an embodiment of the disclosure, the processor 140 may map a luminance value according to the first luminance information to some subpixels among a plurality of subpixels, and map a luminance value according to the second luminance information to the rest subpixels.

Referring to FIG. 8, the processor 140 may acquire a luminance value corresponding to some of a plurality of subpixel values constituting pixel values included in the input frame based on the first luminance information ('A (LUT1)'). The first luminance information ('A(LUT1)') is luminance information corresponding to a high gray scale, and an image to which a luminance value according to the first luminance information ('A(LUT1)') is mapped may be an image of a high gray scale according to a gamma value higher than the reference gamma value according to the input frame.

Also, the processor 140 may acquire a luminance value corresponding to the rest of the plurality of subpixel values based on the second luminance information ('B(LUT2)'). The second luminance information ('B(LUT2)') is luminance information corresponding to a low gray scale, and an image to which a luminance value according to the second luminance information ('B(LUT2)') is mapped may be an image of a low gray scale according to a gamma value lower than the reference gamma value according to the input frame.

Then, the processor 140 may mux an image of a high gray scale and an image of a low gray scale, and acquire an output frame. The output frame may provide an effect that the luminance according to the reference gamma value is maintained on the front surface of the display device 100, and at the same time, the viewing angle has been improved on the side surface of the display device 100 by using an image of a low gray scale.

According to an embodiment, an average value of a luminance value according to the first luminance information and a luminance value according to the second luminance information based on a specific gray scale value may correspond to the luminance according to the reference gamma value. As described above, in case the connecting structure of the display panel 120 is 1D1G, the display device 100 can provide an output frame of which viewing angle has been improved by applying accurate color control (ACC) of a low gray scale and a high gray scale according to the locations of RGB subpixels. According to the various embodiments as described above, a display device where a viewing angle that was limited according to a gray scale can be improved without changing the structure of the display panel can be provided. In the display device according to the disclosure, additional data lines, driving ICs, etc. are unnecessary, and thus increase of the manufacturing cost can be prevented. Also, as improvement of the viewing angle is possible regardless of the structure of the display panel, an advantage that all display panels of which manufacturing companies or structures are different can be used exists.

Figure 9:
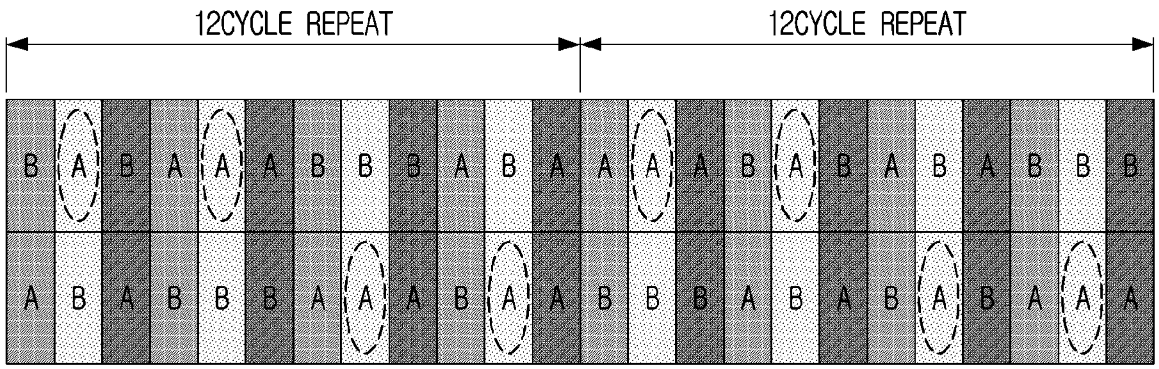
FIG. 9 is a diagram of mapping a luminance value to a green (G) subpixel according to an embodiment of the disclosure.

FIG. 9 is a diagram of mapping a luminance value to a green (G) subpixel according to an embodiment of the disclosure.

Referring to FIG. 9, the processor 140 according to an embodiment of the disclosure may map a luminance value according to the first luminance information such that each of two green (G) subpixels of which luminance values were acquired based on the first luminance information is included in adjacent pixels. Also, the processor 140 may map a luminance value according to the second luminance information such that each of two green (G) subpixels of which luminance values were acquired based on the second luminance information is included in adjacent pixels.

Referring to FIG. 9, according to an embodiment of the disclosure, the processor 140 may alternatingly map luminance values to R subpixels (or, B subpixels) in one group included in the first pixel line in the order of a luminance value according to the second luminance information (B), a luminance value according to the first luminance information (A), a luminance value according to the second luminance information (B), and a luminance value according to the first luminance information (A). However, this is merely an example, and the processor 140 may alternatingly map luminance values to R subpixels (or, B subpixels) in one group included in the first pixel line in the order of a luminance value according to the second luminance information (B), a luminance value according to the second luminance information (B), a luminance value according to the first luminance information (A), and a luminance value according to the first luminance information (A).

The processor 140 according to an embodiment may alternatingly map luminance values to G subpixels in one group included in the first pixel line in the order of a luminance value according to the second luminance information (B), a luminance value according to the second luminance information (B), a luminance value according to the first luminance information (A), and a luminance value according to the first luminance information (A). As another example, the processor 140 may alternatingly map luminance values to G subpixels in one group included in the first pixel line in the order of a luminance value according to the first luminance information (A), a luminance value according to the first luminance information (A), a luminance value according to the second luminance information (B), and a luminance value according to the second luminance information (B).

That is, the processor 140 may map luminance values according to the same luminance information to two consecutive G subpixels. For example, the processor 140 may map a luminance value according to the first luminance information (A) to the first G subpixel among a plurality of subpixels included in one group, and map a luminance value according to the first luminance information (A) to the adjacent second G subpixel. Then, the processor 140 may map a luminance value according to the second luminance information (B) to each of the adjacent third and fourth G subpixels.

As another example, the processor 140 may map a luminance value according to the second luminance information (B) to the first G subpixel among a plurality of subpixels included in one group, and map a luminance value according to the second luminance information (B) to the adjacent second G subpixel. Then, the processor 140 may map a luminance value according to the first luminance information (A) to each of the adjacent third and fourth G subpixels.

Figure 2:
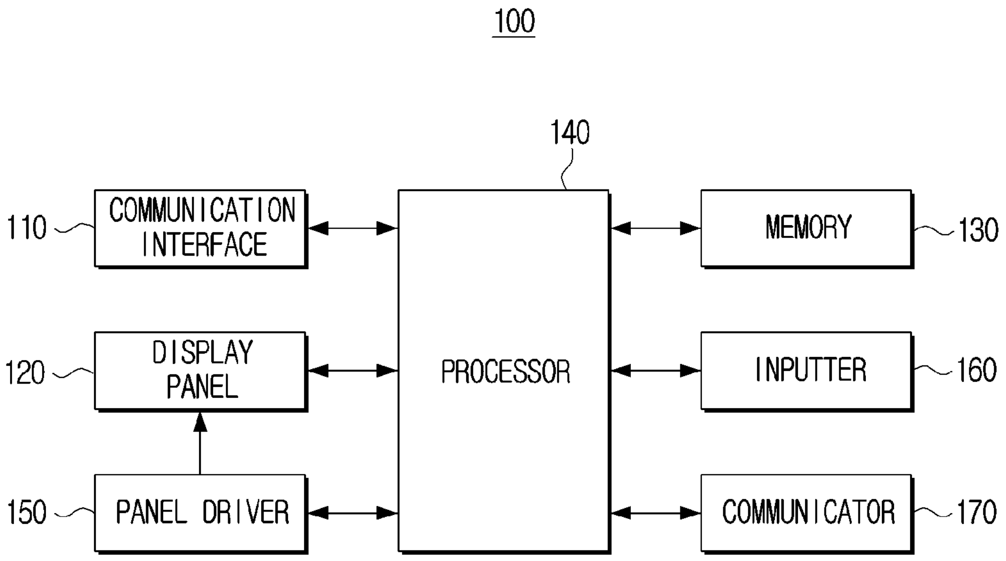
FIG. 2 is a block diagram of a configuration of a display apparatus according to an embodiment of the disclosure.

FIG. 2 is a block diagram of a configuration of a display apparatus according to an embodiment of the disclosure.

Referring to FIG. 2, the display device 100 may include a communication interface 110, a display panel 120, a memory 130, a processor 140, a panel driver 150, an inputter 160, and a communicator 170. However, the display device 100 does not necessarily have to include all of the aforementioned components as in the embodiment of FIG. 2. Also, the display device 100 may additionally include components such as an audio outputter, a power part, etc. that are not illustrated.

The display panel 120 may include members such as a liquid crystal layer, a pixel electrode, a liquid crystal capacitor, a gate line, a data line, a backlight unit, etc. The display panel 120 may express the brightness of each pixel according to a luminance value identified through the luminance information.

The memory 130 is electronically connected with the processor 140, and it may store data necessary for the various embodiments of the disclosure. For example, the memory 130 may be implemented as an internal memory such as a read-only memory (ROM) (e.g., an electrically erasable programmable read-only memory (EEPROM)), a random access memory (RAM), etc. included in the processor 140, or a separate memory from the processor 140.

The memory 130 may be implemented in a form of a memory embedded in the display device 100, or in a form of a memory that can be attached to or detached from the display device 100, according to the usage of stored data. For example, in the case of data for operating the display device 100, the data may be stored in a memory embedded in the display device 100, and in the case of data for an extended function of the display device 100, the data may be stored in a memory that can be attached to or detached from the display device 100. In case the memory 130 is implemented as a memory embedded in the display device 100, the memory 130 may be at least one of a volatile memory (e.g.: a dynamic RAM (DRAM), a static RAM (SRAM), or a synchronous dynamic RAM (SDRAM), etc.) or a non-volatile memory (e.g.: an one time programmable ROM (OTPROM), a programmable ROM (PROM), an erasable and programmable ROM (EPROM), an EEPROM, a mask ROM, a flash ROM, a flash memory (e.g.: NAND flash or NOR flash, etc.), a hard drive, or a solid state drive (SSD)).

In case the memory 130 is implemented as a memory that can be attached to or detached from the display device 100, the memory 130 may be a memory card (e.g., compact flash (CF), secure digital (SD), micro secure digital (Micro-SD), mini secure digital (Mini-SD), extreme digital (xD), a multi-media card (MMC), etc.), an external memory that can be connected to a USB port (e.g., a USB memory), etc.

Luminance information may be stored in the memory 130 inside the display device 100, or luminance information stored in an external server may be used. In this case, the communicator 170 may communicate with the external server, and receive the luminance information.

The panel driver 150 may provide a driving signal to the display panel 120. For example, the panel driver 150 may include a gate driver, a data driver, a gray scale voltage generation part, and a signal controller. In the embodiment of FIG. 2, the panel driver 150 is described as a separate component, but in another embodiment of the disclosure, the processor 140 may perform the role of the panel driver 150 together.

The inputter 160 may be implemented as a device such as a button, a touch pad, a mouse, and a keyboard, or it may also be implemented as a touch screen, a remote transceiver, etc. that can perform the aforementioned display function and a manipulation input function together. The remote transceiver may receive a remote control signal from an external remote control device, or transmit a remote control signal through at least one communication method among infrared communication, Bluetooth communication, and Wi-Fi communication.

The communicator 170 may communicate with an internal component or an external device. For example, the communicator 170 may receive image data, a look up table, etc.

The communicator 170 may use various methods such as a HDMI, low voltage differential signaling (LVDS), a LAN, a USB, an I2C, parallel, etc. However, the communication methods are not limited to the aforementioned communication methods, and for example, the communicator 170 may also communicate with an external server, etc. by a wireless communication method.

The outputter outputs an acoustic signal. For example, the outputter may convert a digital acoustic signal processed at the processor 140 into an analog acoustic signal, amplify the signal, and output it. For example, the outputter may include at least one speaker unit, a D/A converter, an audio amplifier, etc. that can output at least one channel. According to an embodiment, the outputter may be implemented to output various multi-channel acoustic signals. In this case, the processor 140 may enhance-process an acoustic signal input to correspond to enhance-processing of the input frame, and control the outputter to output the signal. For example, the processor 140 may convert an input two-channel acoustic signal into a virtual multi-channel (e.g., a 5.1 channel) acoustic signal, recognize the location where the display device 100' is placed and process the signal into a stereo-scopic acoustic signal optimized for the space, or provide an acoustic signal optimized according to the type (e.g., the content genre) of the input frame.

The display device 100 may additionally include a tuner and a demodulation part depending on implementation examples. The tuner may tune a channel selected by a user in a radio frequency (RF) broadcast signal received through an antenna, or all pre-stored channels, and receive an RF broadcast signal. The demodulation part may receive a converted digital IF (DIF) signal from the tuner and demodulate the signal, and perform channel demodulation, etc. According to an embodiment, an input frame received through the tuner may be processed through the demodulation part, and provided to the processor 140 for the image-processing according to an embodiment of the disclosure.

Figure 10:
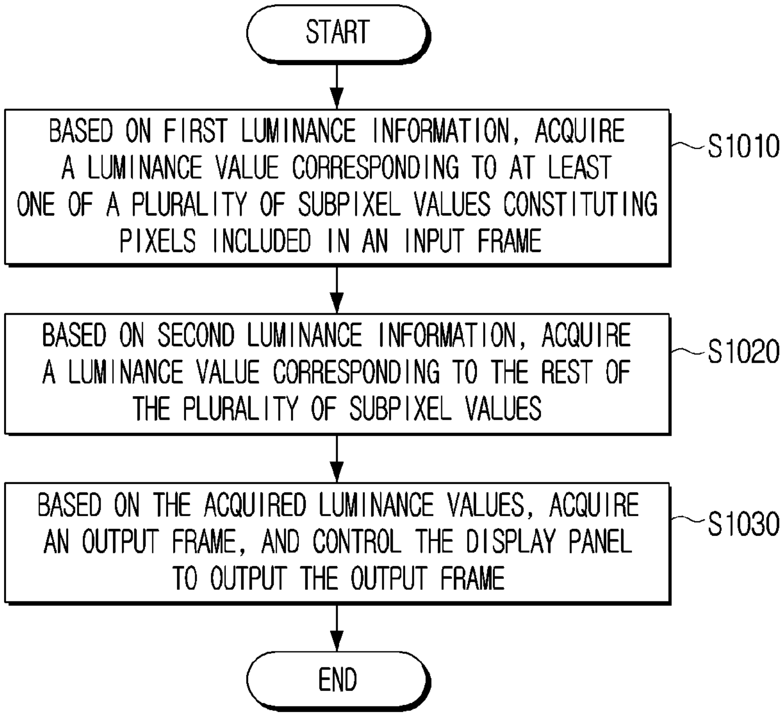
FIG. 10 is a flowchart of a control method for a display device according to an embodiment of the disclosure.

FIG. 10 is a flowchart of a control method for a display device according to an embodiment of the disclosure.

In a control method for a display device including a display panel including a plurality of pixels respectively consisting of red (R), green (G), and blue (B) subpixels, and first luminance information corresponding to a first gamma value and second luminance information corresponding to a second gamma value according to an embodiment of the disclosure, based on the first luminance information, a luminance value corresponding to at least one of the plurality of subpixel values constituting pixel values included in an input frame is acquired in operation S1010.

Based on the second luminance information, a luminance value corresponding to the rest of the plurality of subpixel values is acquired in operation S1020.

Based on the acquired luminance values, the display panel is controlled to output an output frame in operation S1030.

The display panel may have a structure where a plurality of pixels are arranged in a matrix form, and the control method according to an embodiment may further include the steps of applying a voltage of first polarity to subpixels of the same color included in the same first row in the matrix, and applying a voltage of second polarity to subpixels of the same color included in the second row adjacent to the first row.

The control method may include the step of grouping the plurality of pixels into a plurality of pixel groups, and the operation S1010 of acquiring a luminance value based on the first luminance information may include the step of, for first subpixels among the plurality of subpixels of the same color included in one group among the plurality of groups, acquiring a luminance value based on the first luminance information. Also, the operation S1020 of acquiring a luminance value based on the second luminance information may include the step of, for second subpixels among the plurality of subpixels, acquiring a luminance value based on the second luminance information, and the number of the first subpixels and the number of the second subpixels may be the same.

The control method according to an embodiment of the disclosure may include the step of alternatingly mapping the luminance value acquired based on the first luminance information and the luminance value acquired based on the second luminance information to the subpixels of the same color included in the same first row in the matrix.

Also, the control method according to an embodiment may include the step of grouping the plurality of pixels into a plurality of groups respectively including four pixels, and the step of applying a voltage may include the steps of applying a voltage of the first polarity to two R subpixels included in one group among the plurality of groups, and applying a voltage of the second polarity to the rest two R subpixels, and applying a voltage of the first polarity to two B subpixels included in one group among the plurality of groups, and applying a voltage of the second polarity to the rest two B subpixels.

The operation S1010 of acquiring a luminance value based on the first luminance information may include the steps of, based on the first luminance information, acquiring a luminance value corresponding to one of the two R subpixels to which the voltage of the first polarity is applied, and based on the first luminance information, acquiring a luminance value corresponding to one of the two G subpixels to which the voltage of the first polarity is applied, and based on the first luminance information, acquiring a luminance value corresponding to one of the two B subpixels to which the voltage of the first polarity is applied, and the operation S1020 of acquiring a luminance value based on the second luminance information may include the steps of, based on the second luminance information, acquiring a luminance value corresponding to the rest one of the two R subpixels to which the voltage of the first polarity is applied, and based on the second luminance information, acquiring a luminance value corresponding to the rest one of the two G subpixels to which the voltage of the first polarity is applied, and based on the second luminance information, acquiring a luminance value corresponding to the rest one of the two B subpixels to which the voltage of the first polarity is applied.

Also, the operation S1010 of acquiring a luminance value based on the first luminance information according to an embodiment may include the steps of, based on the first luminance information, acquiring a luminance value corresponding to one of the two R subpixels to which the voltage of the second polarity is applied, and based on the first luminance information, acquiring a luminance value corresponding to one of the two G subpixels to which the voltage of the second polarity is applied, and based on the first luminance information, acquiring a luminance value corresponding to one of the two B subpixels to which the voltage of the second polarity is applied, and the operation S1020 of acquiring a luminance value based on the second luminance information may include the steps of, based on the second luminance information, acquiring a luminance value corresponding to the rest one of the two R subpixels to which the voltage of the second polarity is applied, and based on the second luminance information, acquiring a luminance value corresponding to the rest one of the two G subpixels to which the voltage of the second polarity is applied, and based on the second luminance information, acquiring a luminance value corresponding to the rest one of the two B subpixels to which the voltage of the second polarity is applied.

The two G subpixels of which luminance values were acquired based on the first luminance information may be respectively included in adjacent pixels, and the two G subpixels of which luminance values were acquired based on the second luminance information may be respectively included in adjacent pixels.

Also, the first luminance information corresponding to a first gamma value may correspond to a high gray scale greater than or equal to a threshold gray scale, and the second luminance information corresponding to a second gamma value may correspond to a low gray scale smaller than the threshold gray scale.

In addition, the plurality of respective subpixels may be connected with one gate line and one data line.

The various embodiments of the disclosure can be applied not only to a display device, but all electronic devices which can perform image processing such as an image receiving device like a set-top box, an image processing device, etc.

The various embodiments described above may be implemented in a recording medium that can be read by a computer or a device similar to a computer, by using software, hardware, or a combination thereof. In some cases, the embodiments described in this specification may be implemented as the processor itself. According to implementation by software, the embodiments such as procedures and functions described in this specification may be implemented as separate software modules. Each of the software modules can perform one or more functions and operations described in this specification.

Computer instructions for performing processing operations of the acoustic output device according to the aforementioned various embodiments of the disclosure may be stored in a non-transitory computer-readable medium. Computer instructions stored in such a non-transitory computer-readable medium may make the processing operations at the acoustic output device according to the aforementioned various embodiments performed by a specific machine, when the instructions are executed by the processor of the specific machine.

A non-transitory computer-readable medium refers to a medium that stores data semi-permanently, and is readable by machines, but not a medium that stores data for a short moment such as a register, a cache, and a memory. As specific examples of a non-transitory computer-readable medium, there may be a compact-disc (CD), a digital versatile disc (DVD), a hard disc, a blue-ray disc, a USB, a memory card, a ROM and the like.

Also, while embodiments of the disclosure have been shown and described, the disclosure is not limited to the aforementioned specific embodiments, and it is apparent that various modifications can be made by those having ordinary skill in the art to which the disclosure belongs, without departing from the gist of the disclosure as claimed by the appended claims, and it is intended that such modifications are not to be interpreted independently from the technical idea or prospect of the disclosure.

What is claimed is:

1. A display device comprising:

a communication interface comprising a circuit;

a display panel comprising a plurality of pixels, the plurality of pixels comprising red (R), green (G), and blue (B) subpixels;

a memory configured to store first luminance information and second luminance information; and a processor configured to:

acquire, based on the first luminance information, a luminance value corresponding to at least one of a plurality of subpixel values included in an input frame received via the communication interface, acquire, based on the second luminance information, a luminance value corresponding to the remaining of the plurality of subpixel values, based on the acquired luminance values, acquire an output frame, and control the display panel to output the output frame, wherein the processor is further configured to:

group the plurality of pixels into a plurality of groups each including a number of pixels such that each group of the plurality of groups comprises R subpixels, G subpixels, and B subpixels, and at least one of:

apply a voltage of a first polarity to at least one R subpixel of the R subpixels and apply a voltage of a second polarity to the remaining R subpixels of the R subpixels, apply a voltage of the first polarity to at least one G subpixel of the G subpixels and apply a voltage of the second polarity to the remaining G subpixels of the G subpixels, and apply a voltage of the first polarity to at least one B subpixel of the B subpixels and apply a voltage of the second polarity to the remaining B subpixels of the B subpixels.

2. The display device of claim 1, wherein the display panel comprises a structure in which the plurality of pixels are arranged in a matrix, and wherein the processor is further configured to:

apply a voltage of the first polarity to first subpixels of the same color included in a first row in the matrix, and apply a voltage of the second polarity to second subpixels of the same color included in a second row adjacent to the first row.

3. The display device of claim 2, wherein the processor is further configured to:

for third subpixels among the plurality of subpixels of the same color included in one group among the plurality of groups, acquire a luminance value based on the first luminance information, and for fourth subpixels among the plurality of subpixels, acquire a luminance value based on the second luminance information, and wherein a number of the third subpixels and a number of the fourth subpixels are the same.

4. The display device of claim 3, wherein the number of the third subpixels having luminance values acquired based on the first luminance information and the number of the fourth subpixels having luminance values acquired based on the second luminance information are the same.

5. The display device of claim 2, wherein the processor is further configured to:

alternatingly map the luminance value acquired based on the first luminance information and the luminance value acquired based on the second luminance information to the first subpixels of the same color included in the first row in the matrix.

6. The display device of claim 1, wherein each group of the plurality of groups comprises four pixels such that each group of the plurality of groups comprises four R subpixels, four G subpixels, and four B subpixels, and wherein the processor is further configured to, at least one of:

apply a voltage of the first polarity to two R subpixels included in one group among the plurality of groups, and apply a voltage of the second polarity to a remaining two R subpixels, apply a voltage of the first polarity to two G subpixels included in one group among the plurality of groups, and apply a voltage of the second polarity to a remaining two G subpixels, and apply a voltage of the first polarity to two B subpixels included in one group among the plurality of groups, and apply a voltage of the second polarity to a remaining two B subpixels.

7. The display device of claim 6, wherein the processor is further configured to:

based on the first luminance information, acquire a luminance value corresponding to one of the two R subpixels to which the voltage of the first polarity is applied, and based on the second luminance information, acquire a luminance value corresponding to a remaining one of the two R subpixels to which the voltage of the first polarity is applied, based on the first luminance information, acquire a luminance value corresponding to one of the two G subpixels to which the voltage of the first polarity is applied, and based on the second luminance information, acquire a luminance value corresponding to a remaining one of the two G subpixels to which the voltage of the first polarity is applied, and based on the first luminance information, acquire a luminance value corresponding to one of the two B subpixels to which the voltage of the first polarity is applied, and based on the second luminance information, acquire a luminance value corresponding to a remaining one of the two B subpixels to which the voltage of the first polarity is applied.

8. The display device of claim 7, wherein the processor is further configured to:

based on the first luminance information, acquire a luminance value corresponding to one of the two R subpixels to which the voltage of the second polarity is applied, and based on the second luminance information, acquire a luminance value corresponding to the remaining one of the two R subpixels to which the voltage of the second polarity is applied, based on the first luminance information, acquire a luminance value corresponding to one of the two G subpixels to which the voltage of the second polarity is applied, and based on the second luminance information, acquire a luminance value corresponding to the remaining one of the two G subpixels to which the voltage of the second polarity is applied, and based on the first luminance information, acquire a luminance value corresponding to one of the two B subpixels to which the voltage of the second polarity is applied, and based on the second luminance information, acquire a luminance value corresponding to the remaining one of the two B subpixels to which the voltage of the second polarity is applied.

9. The display device of claim 8, wherein the two G subpixels for which luminance values were acquired based on the first luminance information are respectively included in adjacent pixels, and wherein the two G subpixels for which luminance values were are acquired based on the second luminance information are respectively included in adjacent pixels.

10. The display device of claim 1, wherein the first luminance information comprises a luminance value corresponding to a high gray scale greater than or equal to a threshold gray scale, and wherein the second luminance information comprises a luminance value corresponding to a low gray scale less than the threshold gray scale.

11. The display device of claim 1, wherein a plurality of subpixels of the plurality of pixels are connected with one gate line and one data line.

12. A control method for a display device comprising a display panel comprising a plurality of pixels comprising red (R), green (G), and blue (B) subpixels, the method comprising:

acquiring, based on first luminance information, a luminance value corresponding to at least one of the plurality of subpixel values of pixels included in an input frame;

acquiring, based on second luminance information, a luminance value corresponding to remaining subpixel values of the plurality of subpixel values;

grouping the plurality of pixels into a plurality of groups each including a number of pixels such that each group of the plurality of groups comprises R subpixels, G subpixels, and B subpixel s, at least one of:

applying a voltage of a first polarity to at least one R subpixel of the R subpixels and apply a voltage of a second polarity to the remaining R subpixels of the R subpixels;

applying a voltage of the first polarity to at least one G subpixel of the G subpixels and apply a voltage of the second polarity to the remaining G subpixels of the G subpixels; and applying a voltage of the first polarity to at least one B subpixel of the B subpixels and apply a voltage of the second polarity to the remaining B subpixels of the B subpixels;

based on the acquired luminance values, acquiring an output frame; and controlling the display panel to output the acquired output frame.

13. The control method of claim 12, wherein the display panel comprises a structure in which the plurality of pixels are arranged in a matrix, and wherein the method further comprises:

applying a voltage of the first polarity to first subpixels of the same color included in a first row in the matrix; and applying a voltage of the second polarity to second subpixels of the same color included in a second row adjacent to the first row.

14. The control method of claim 13, wherein the acquiring the luminance value based on the first luminance information comprises:

for third subpixels among the plurality of subpixels of the same color included in one group among the plurality of groups, acquiring a luminance value based on the first luminance information, and wherein the acquiring the luminance value based on the second luminance information comprises:

for fourth subpixels among the plurality of subpixels, acquiring a luminance value based on the second luminance information, and wherein a number of the third subpixels and a number of the fourth subpixels are the same.

15. The control method of claim 14, wherein the number of the third subpixels having luminance values acquired based on the first luminance information and the number of the fourth subpixels having luminance values acquired based on the second luminance information are the same.

16. The control method of claim 13, further comprising:

alternatingly mapping the luminance value acquired based on the first luminance information and the luminance value acquired based on the second luminance information to the first subpixels of the same color included in the first row in the matrix.

17. The control method of claim 12, wherein each group of the plurality of groups comprises four R subpixels, four G subpixels, and four B subpixels, and wherein the control method further comprises at least one of:

applying a voltage of the first polarity to two R subpixels included in one group among the plurality of groups, and apply a voltage of the second polarity to a remaining two R subpixel s, applying a voltage of the first polarity to two G subpixels included in one group among the plurality of groups, and apply a voltage of the second polarity to a remaining two G subpixels, and applying a voltage of the first polarity to two B subpixels included in one group among the plurality of groups, and applying a voltage of the second polarity to a remaining two B subpixels.

18. The control method of claim 17, further comprising:

based on the first luminance information, acquiring a luminance value corresponding to one of the two R subpixels to which the voltage of the first polarity is applied, and based on the second luminance information, acquiring a luminance value corresponding to a remaining one of the two R subpixels to which the voltage of the first polarity is applied, based on the first luminance information, acquiring a luminance value corresponding to one of the two G subpixels to which the voltage of the first polarity is applied, and based on the second luminance information, acquiring a luminance value corresponding to a remaining one of the two G subpixels to which the voltage of the first polarity is applied, and based on the first luminance information, acquiring a luminance value corresponding to one of the two B subpixels to which the voltage of the first polarity is applied, and based on the second luminance information, acquiring a luminance value corresponding to a remaining one of the two B subpixels to which the voltage of the first polarity is applied.

19. The control method of claim 18, further comprising:

based on the first luminance information, acquiring a luminance value corresponding to one of the two R subpixels to which the voltage of the second polarity is applied, and based on the second luminance information, acquiring a luminance value corresponding to the remaining one of the two R subpixels to which the voltage of the second polarity is applied, based on the first luminance information, acquiring a luminance value corresponding to one of the two G subpixels to which the voltage of the second polarity is applied, and based on the second luminance information, acquiring a luminance value corresponding to the remaining one of the two G subpixels to which the voltage of the second polarity is applied, and based on the first luminance information, acquiring a luminance value corresponding to one of the two B subpixels to which the voltage of the second polarity is applied, and based on the second luminance information, acquiring luminance value corresponding to the remaining one of the two B subpixels to which the voltage of the second polarity is applied.

20. The control method of claim 19, wherein the two G subpixels for which luminance values are acquired based on the first luminance information are respectively included in adjacent pixels, and wherein the two G subpixels for which luminance values are acquired based on the second luminance information are respectively included in adjacent pixels.

21. A display device comprising:

a communication interface comprising a circuit;

a display panel comprising a plurality of pixels, the plurality of pixels comprising red (R), green (G), and blue (B) subpixels;

a memory configured to store first luminance information and second luminance information; and a processor configured to:

acquire, based on the first luminance information, a luminance value corresponding to at least one of a plurality of subpixel values included in an input frame received via the communication interface, acquire, based on the second luminance information, a luminance value corresponding to the remaining of the plurality of subpixel values, generate a first frame from the input frame having at least one subpixel value changed based on the acquired first luminance information, generate a second frame from the input frame having at least one subpixel value changed based on the acquired second luminance information, mux the first frame and the second frame to acquire an output frame, and based on the acquired luminance values, control the display panel to output the output frame.

* * * * *